(12) United States Patent
Michel

(10) Patent No.: US 7,694,576 B2
(45) Date of Patent: Apr. 13, 2010

(54) ELECTRIC MOTOR AND/OR TRANSMISSION

(75) Inventor: Frank Michel, Bad Mergentheim (DE)

(73) Assignee: Wittenstein AG, Igersheim (DE)

( * ) Notice: Subject to any disclaimer, the term of this patent is extended or adjusted under 35 U.S.C. 154(b) by 87 days.

(21) Appl. No.: 10/549,459

(22) PCT Filed: Mar. 30, 2004

(86) PCT No.: PCT/EP2004/003343

§ 371 (c)(1),
(2), (4) Date: Sep. 16, 2005

(87) PCT Pub. No.: WO2004/088823

PCT Pub. Date: Oct. 14, 2004

(65) Prior Publication Data

US 2006/0207338 A1    Sep. 21, 2006

(30) Foreign Application Priority Data

Apr. 4, 2003   (DE) ................................ 103 15 630

(51) Int. Cl.
*G01L 1/00*  (2006.01)
(52) U.S. Cl. ...................................................... 73/774

(58) Field of Classification Search .................... 73/774
See application file for complete search history.

(56) References Cited

U.S. PATENT DOCUMENTS

| | | | | |
|---|---|---|---|---|
| 4,188,821 | A | * | 2/1980 | Elias ........................ 73/862.31 |
| 4,384,493 | A | | 5/1983 | Grunbaum |
| 4,724,711 | A | * | 2/1988 | Sakakibara et al. .... 73/862.322 |
| 4,865,143 | A | * | 9/1989 | Hashimoto et al. .......... 180/443 |
| 5,015,926 | A | * | 5/1991 | Casler ............................ 318/9 |
| 5,094,109 | A | * | 3/1992 | Dean et al. ..................... 73/718 |
| 5,327,790 | A | * | 7/1994 | Levin et al. ............. 73/862.325 |
| 5,442,965 | A | * | 8/1995 | Halen ...................... 73/862.22 |
| 5,763,969 | A | | 6/1998 | Metheny et al. |
| 5,841,255 | A | | 11/1998 | Canada et al. |
| 6,026,711 | A | * | 2/2000 | Tortora et al. ................. 74/640 |
| 6,066,907 | A | | 5/2000 | Matsushima et al. |
| 6,091,174 | A | * | 7/2000 | Genster ....................... 310/89 |
| 6,853,951 | B2 | * | 2/2005 | Jarrell et al. ................ 702/181 |

* cited by examiner

*Primary Examiner*—Lisa M Caputo
*Assistant Examiner*—Octavia Davis
(74) *Attorney, Agent, or Firm*—Bachman & LaPointe, P.C.

(57) ABSTRACT

An electric motor and/or a transmission consisting of an input shaft, an output shaft, and a case provided with a centering flange and/or a fixing flange. At least one extension sensor is allocated to the case.

23 Claims, 4 Drawing Sheets

ELECTRIC MOTOR AND/OR TRANSMISSION

BACKGROUND OF THE INVENTION

The present invention relates to an electric motor and/or a transmission having an input drive shaft and an output drive shaft, and having a housing on which a centering flange and/or an attachment flange are/is provided.

Transmissions such as these are known and available in a very wide range of forms and embodiments on the market. They are used essentially for stepping up or down an input drive movement of a motor, electric motor or some other drive. Conventional known electric motors and/or transmissions have the disadvantage that it is difficult to determine their life, their need for maintenance or the maintenance intervals. Furthermore, the life is greatly reduced, for example, in the event of overloading, which is likewise undesirable.

Since no capability to determine the life as well as the operability and load capacity of the electric motor and/or transmission is often known, it is also not possible to influence the spare parts storage, so that a large number of spare parts must be kept in stock, which in turn results in undesirable stock keeping costs.

U.S. Pat. No. 4,384,493 discloses an electric motor which has a centering flange, in which case a housing of the electric motor is rotationally decoupled from the centering flange via a plurality of bearing elements. A force measurement cell is arranged between the housing and the centering flange.

U.S. Pat. No. 5,763,969 discloses an indicating display for an electric motor for driving a flywheel for ventilation, in which case the indicating display has a rotation speed indication in order to indicate the individual revolutions per minute.

U.S. Pat. No. 6,066,907 describes an electric motor having an input drive shaft and a housing, on which a centering flange is provided.

The present invention is based on the object of overcoming the disadvantages mentioned above and of providing an electric motor and/or transmission by means of which functional monitoring is possible for specific loads and uses, for example of forces, moments, temperature, leaks, maintenance intervals etc. A further aim is to allow faster and more reliable assembly and maintenance, with higher availability and productivity and a longer usage capability. A further aim is to make it possible to reduce the spare parts stockholdings. Furthermore, clarification of faults in use should likewise be possible.

SUMMARY OF THE INVENTION

With regard to the present invention, it has been found to be particularly advantageous for the housing of an electric motor and/or transmission to have at least one associated strain sensor, preferably in the form of a strain gauge. It has been found to be preferable for the strain sensor to be provided or arranged close to a centering flange in the cylindrical part of the housing. A plurality of strain sensors which are distributed radially around the circumference are preferably provided, and provide information about the actual forces and torques that are acting.

In this case, the intention is, for example, for an alarm signal to be switched or to be indicated on an integrated indicating electronics device if a maximum permissible torque is exceeded. If required, the complete installation or the manufacturing process in which, for example a transmission such as this is being used, can also be switched off.

However, one important factor with regard to the present invention is that the transmission data can be stored and/or indicated in the indicating electronics device or in an external evaluation unit in particular via at least one strain sensor or else a large number of further sensors which are associated with the electric motor and/or the transmission, such as temperature sensors, further force sensors, rotation speed sensors or the like. In this case, these values are compared with corresponding, stored limit values, in which case a load state as well as a critical or unacceptable load state of the transmission and/or electric motor is indicated or can be indicated.

This makes it possible to check the use of the electric motor and/or transmission during operation, so that the electric motor and/or the transmission can be used on a power-optimized basis, while at the same time allowing a statement to be made exactly about maintenance intervals, life, etc.

In this way, the electric motor and/or the transmission is used only in its permissible limit and load range, considerably increasing the life.

It has also been found to be advantageous, likewise leading to an increase in life, for at least one damping element to be inserted radially circumferentially into a casing surface in the centering flange of the electric motor and/or transmission, in order to ensure damping and oscillating radial bearing and centering. In this case, the damping element may, for example, be in the form of a radially circumferential O-ring, which overhangs a casing surface on the outside. This is likewise intended to be covered by the scope of the present invention. This also avoids secondary force paths while likewise contributing to longer life of the transmission and/or electric motor.

In one preferred exemplary embodiment of the present invention, the housing of the electric motor and/or transmission is provided with an attachment flange, which is separated from the actual housing by means of an annular incision, and in this way has a constriction in the form of an annular ring. The at least one strain sensor is arranged or associated in the area of this constriction.

This allows the applied forces, torques etc. to be determined and established considerably more accurately.

The scope of the invention is intended to cover the attachment flange surrounding the housing coaxially completely or else only at least partially in the form of a sleeve, with the strain sensors being separated from one another radially in the area of the constriction or of the constrictions.

BRIEF DESCRIPTION OF THE DRAWINGS

Further advantages, features and details of the invention will become evident from the following description of preferred exemplary embodiments and from the drawing, in which.

DETAILED DESCRIPTION

Figure 1:
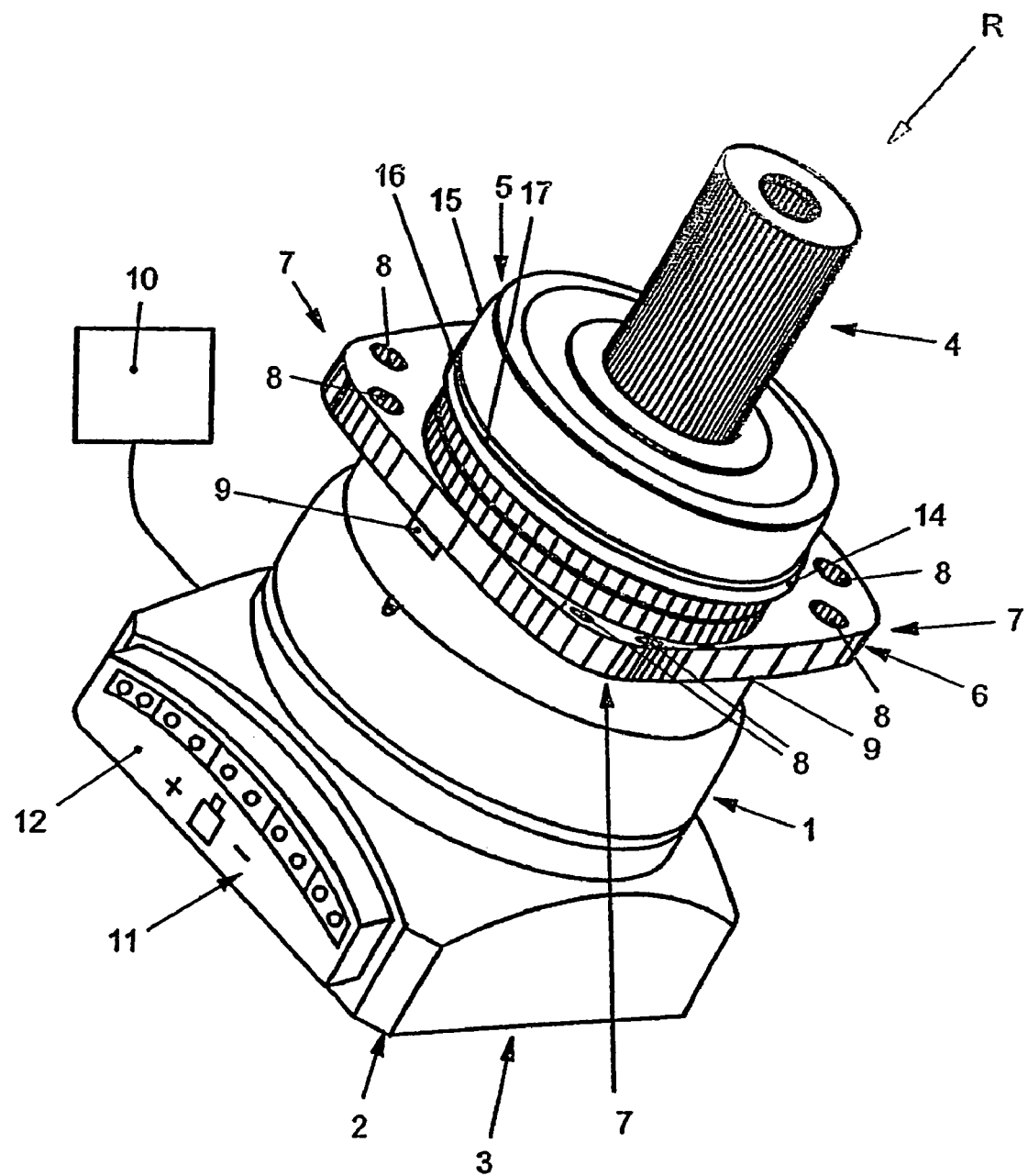
FIG. 1 shows a schematically illustrated plan view of a transmission with a strain sensor, an indicating electronics device and a damping element.

As can be seen from FIG. 1, a transmission R has a housing 1, in which an input drive shaft 3 is provided in the area of a base flange 2, which is not illustrated in any more detail, but is only indicated here, which transmission R steps up or steps down a rotary movement to an output drive shaft 4 by means of transmission elements, epicyclic gears, planet wheel carriers, revolving planet gear mounts, etc. which are not illustrated here.

In the region of the output drive shaft 4, the transmission R has a centering flange 5. This is slightly spherical and is designed to taper outward. There is an attachment flange 6 adjacent to the centering flange 5, which attachment flange 6 has attachment screw holes 8 in particular in its corner areas 7.

Two attachment screw holes 8 which are a distance from one another are preferably formed in each corner area 7 of the attachment flange 6. In particular, two, three and preferably four corner areas 7 may each be provided with arrangements of attachment screw holes 8 as the attachment flange 6.

One important factor with regard to the present invention is that the housing 1 has at least one associated strain sensor 9 in the cylindrical part of the housing 1, preferably underneath the attachment flange 6. The strain sensor 9, which measures forces and torques, is preferably a strain gauge.

One important factor with regard to the present invention is the position of the strain sensor 9 close to the attachment flange 6 on the housing 1. However, it is also intended to be within the scope of the present invention for the strain sensor 9 to be associated directly with the attachment flange 6.

However, it has been found to be particularly advantageous for the strain sensor 9 in each case to be arranged between an arrangement of attachment screw holes 8 and two mutually adjacent corner areas 7 on the housing 1, close to the attachment flange 6.

This makes it possible to determine torques, force profiles, in particular forces which are introduced into the attachment flange 6 via the housing, allowing operating states of the transmission R to be deduced. The strain sensors 9 may be connected to an external evaluation unit 10, as is merely indicated here, or to an indicating electronics device 11 in which the corresponding signals are evaluated and stored. If required, the measured values may also be stored over time in the evaluation unit 10 and/or in the indicating electronics device 11 in order to obtain corresponding statements about the life, load states, etc.

Figure 2:
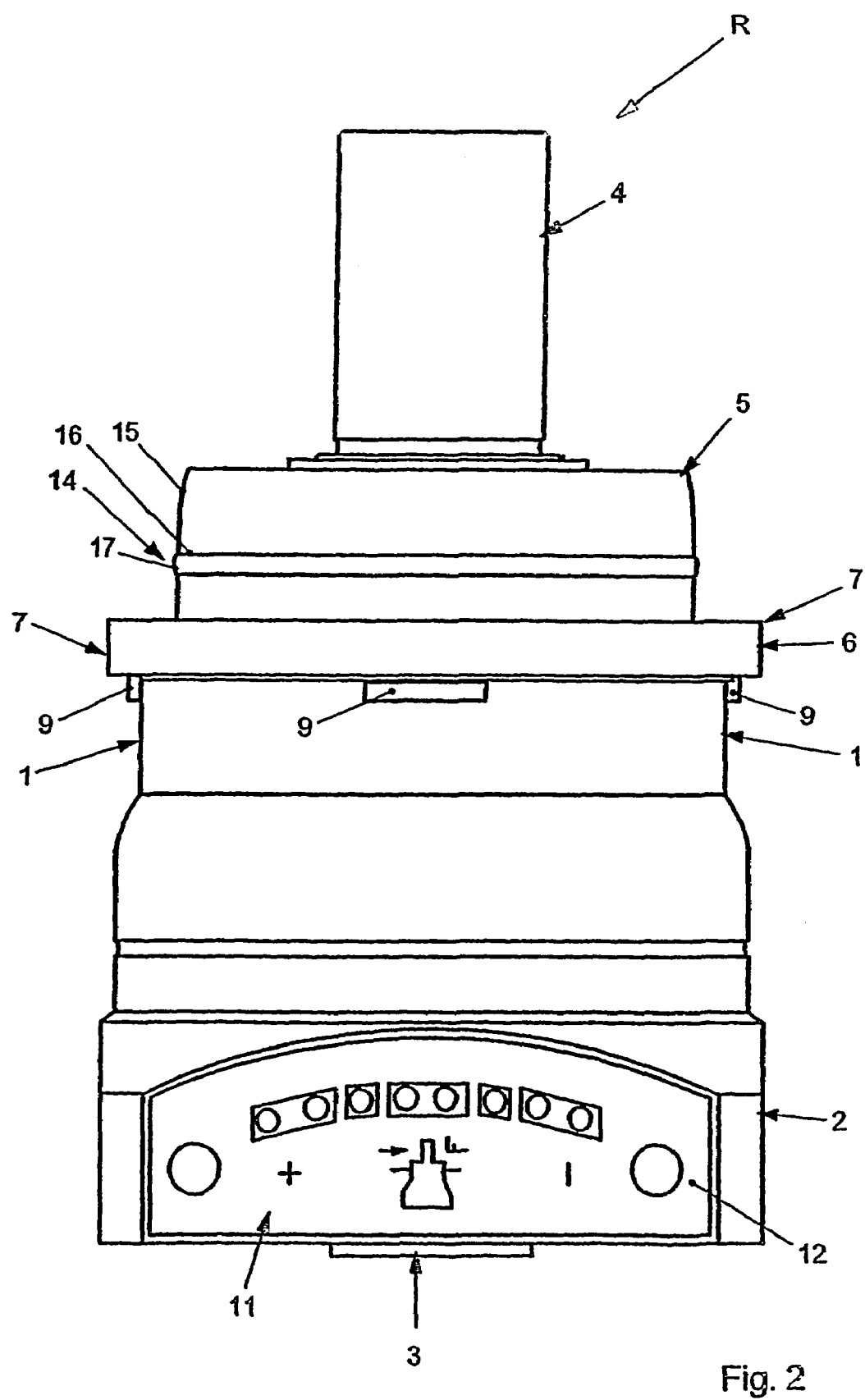
FIG. 2 shows a schematically illustrated side view of the transmission shown in FIG. 1.
Figure 3:
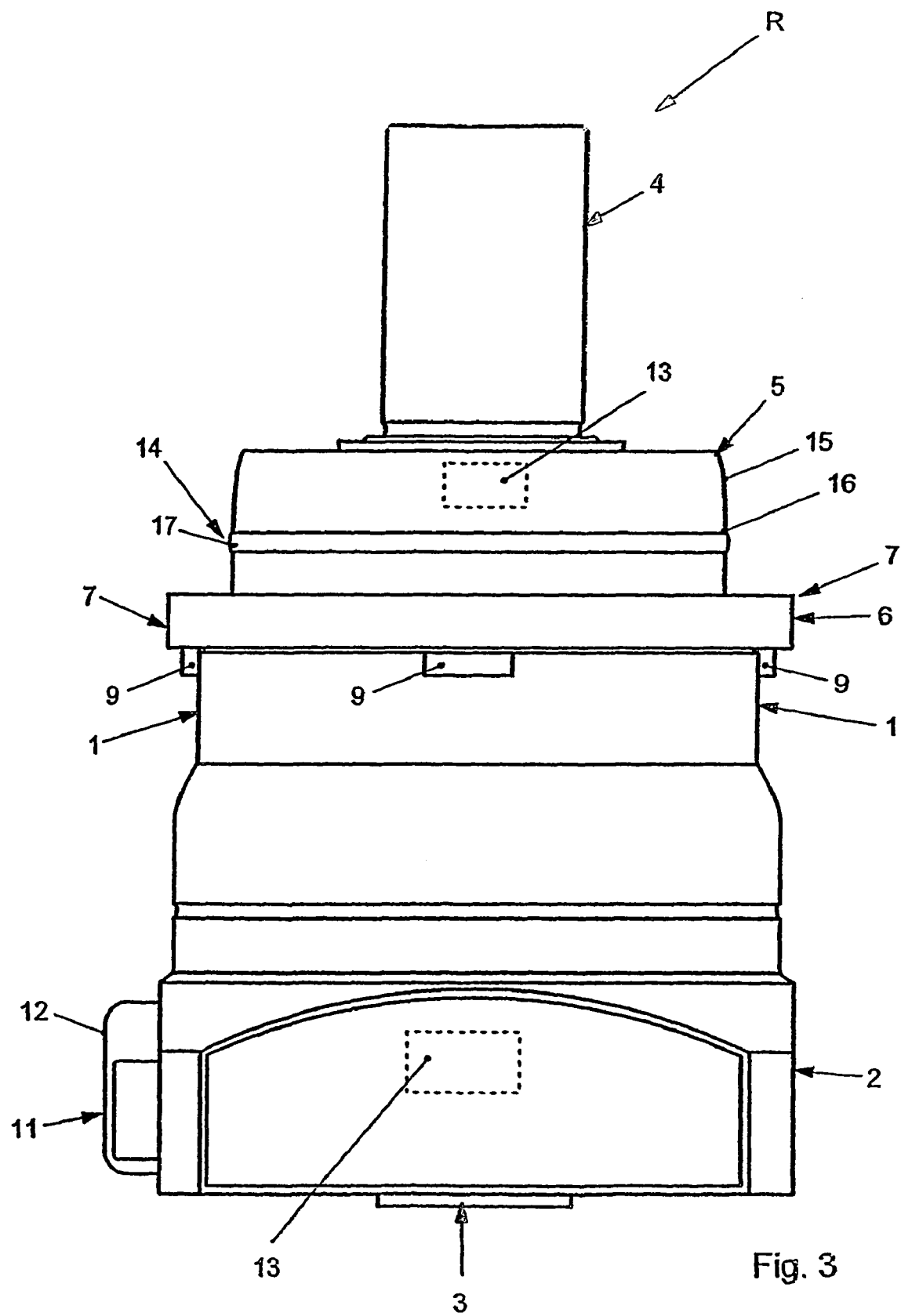
FIG. 3 shows a further view of the transmission as shown in FIG. 1.

The indicating electronics device 11, as is illustrated in FIGS. 1 to 3, is preferably fitted to the base flange 2 of the housing 1, and may also be in the form of an indicating display 12.

The indicating display 12 visually indicates when the transmission R has excessively high forces applied to it. A visual alarm can then be signaled in an appropriate form, or else an audible alarm or some other alarm can be generated in a central monitoring facility. Furthermore, other values, such as temperature, required maintenance intervals or maintenance times as well as lives of the transmission can also be read and evaluated on the indicating display 12. The indicating display 12 can be switched manually to the respective parameters to be displayed, as desired.

One advantage with the present invention is that an optimum operating state is always ensured by the determination of transmission-specific parameters or electric-motor-specific parameters, such as forces, torques, temperature and possibly also the lubricant oil level. Maintenance can also be carried out on a planned basis or at the appropriate time, for example in the event of loss of lubricant. In consequence, all the components of the transmission are loaded only within the permissible range, leading to an increase in life. This allows the life to be determined considerably more exactly, as is particularly advantageous for spare parts stock-keeping. In consequence, a spare parts store can be defined and optimized exactly, for example, for a large number of transmissions that are in use. This allows small quantities of spare parts to be stored and to be subsequently manufactured, or manufactured in advance, as required, also taking into account predicted lead times.

In order, for example, to allow monitoring of the temperature of the transmission, the temperature of the lubricant, the number of revolutions, a leakage, a filling level or the like, further appropriate sensors 13 which determine these parameters are provided within the transmission R, in particular in the housing 1, as indicated by dashed lines in FIG. 3. These sensors 13 are likewise connected to the indicating electronics device 11 and/or to the indicating display 12 and can be read and indicated visually. It is also feasible for these values to be stored over time, thus allowing the operating state to be verified over time, as well. This helps in particular to provide appropriate evidence, for example in the event of misuse.

In the case of the present invention, it has also been found to be advantageous, as is indicated clearly in particular in FIGS. 2 and 3, for at least one radially circumferential damping element 14 to be provided in an at least partially circumferential groove 16 in the area of the centering flange 5, between the attachment flange 6 and the output drive shaft 4, which preferably tapers in the outward direction and is slightly spherical. It is also important for the present invention for the damping element 14, which is inserted radially circumferentially into a casing surface of the centering flange 5, to be in the form of an elastically deformable element. The damping element 14 is preferably in the form of a rubber element, and clasps the surface of the centering flange 5.

An O-ring 17 is preferably inserted into the circumferential groove 16 as the damping element 14.

If the centering flange 5 of the transmission R is inserted into an appropriate, matching holding flange, then the transmission R is mounted floating and exactly centrally by means of the damping element 14 in a holding flange that is not illustrated here. The important factor is a floating bearing, so that no secondary force paths can be created. In this case, it is likewise intended to be within the scope of the present invention for, for example, a plurality of radially circumferential grooves 16, which are arranged parallel to one another, to be provided externally in the centering flange 5, in order to provide a plurality of damping elements 14 and/or O-rings 17 radially on the centering flange 5.

In comparison to conventional centering flanges, the centering flange 5 in the case of the present invention has play with respect to a holding flange which is not illustrated, so that the damping elements 14, which project outward beyond the centering flange 5, form a floating bearing.

In particular, it is intended to be within the scope of the present invention for the transmission to be in the form of an electric motor or a unit comprising an electric motor and transmission.

Figure 4:
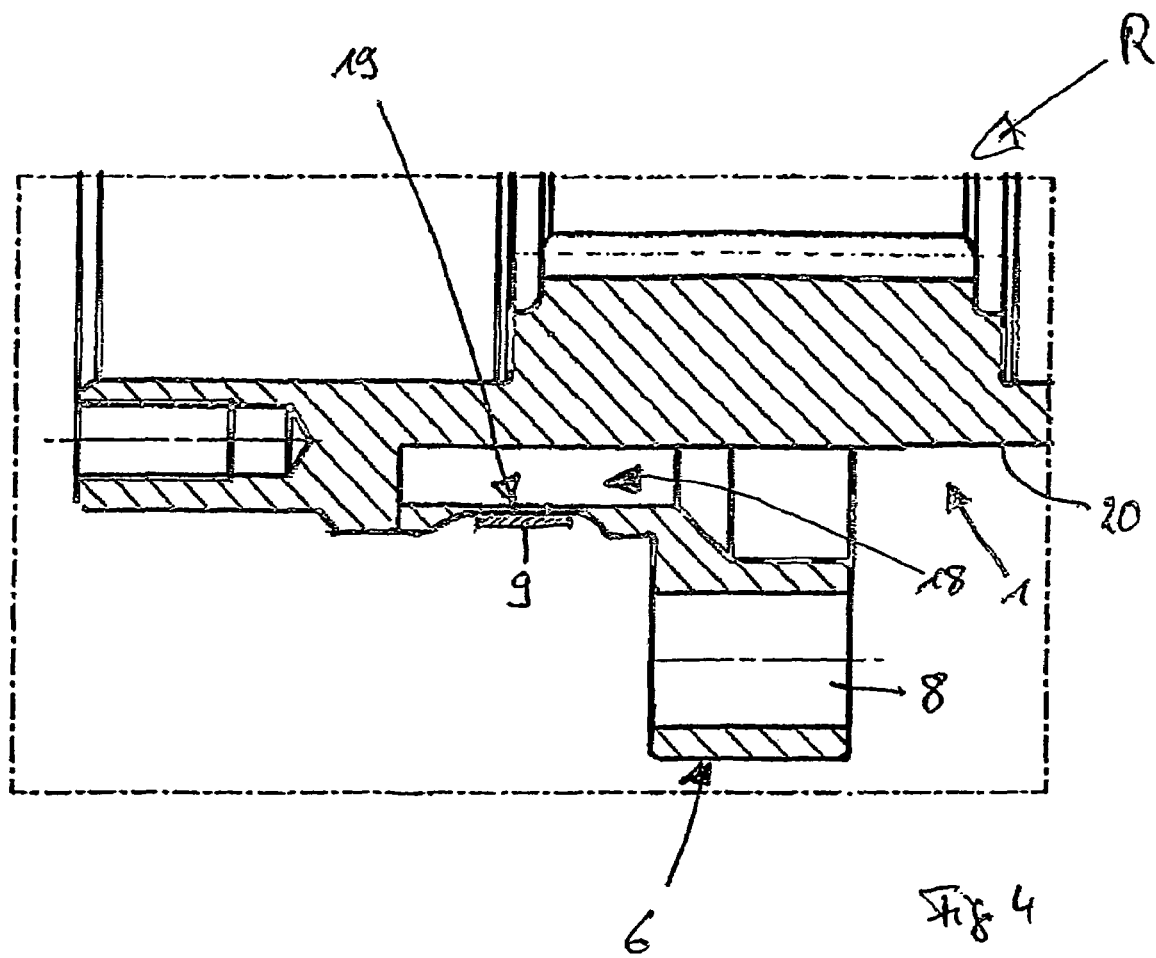
FIG. 4 shows a schematically illustrated longitudinal section through a housing of an electric motor and/or transmission R.

In one preferred exemplary embodiment of the present invention, as shown in FIG. 4, a housing 1 of an electric motor and/or transmission R is indicated, although only a cross-sectional area of the housing 1 is indicated. On the outside, this is adjacent to an attachment flange 6, which is separated from a casing surface 20 of the housing 1 via an incision 18.

A constriction 19, which is used to accommodate at least one strain sensor 9, is formed in the area of the incision 18 in the attachment flange 6.

A plurality of strain sensors 9 which are arranged separated from one another radially around the circumferential constriction 19 or around the attachment flange 6 are preferably arranged or provided.

Furthermore, the attachment flange 6 has a plurality of attachment screw holes 8, as are also indicated by way of example in FIG. 1. However, it is preferable for the attachment flange 6 to at least partially or completely coaxially surround the housing 1 or the casing surface 20 in an annular form, and for the incision 18 likewise to be formed, like a sleeve, from the attachment flange 6 itself, between the casing surface 20 of the housing 1.

The radially circumferential constriction 19, in particular, allows exact sensitive determination of the resulting forces, torques etc., in this area, via the strain sensor 9. This has been found to be advantageous in the case of the present invention.

The invention claimed is:

1. Transmission comprising a driveshaft (3), an output shaft (4) and a housing (1) including a centering flange (5) and an attachment flange (6), the housing (1) is provided with at least one electronic display system (11), wherein the electronic display system (11) is connected to a plurality of sensors (13) distributed radially around the housing comprising strain sensors, force sensors, temperature sensors and, incremental sensor, assigned to a transmission, permissible values and limiting values such as force, temperature, service life, number of revolutions are visually displayed and read off on the electronic display system (11) wherein the values which are generated in the electronic display system (11), are transmitted in a wireless fashion to an external evaluation device (10), wherein the housing is provided with a radially circumferential constriction (19) and a plurality of the strain sensors are arranged separated from one another radially around the circumferential constriction.

2. Transmission according to claim 1, wherein the centering flange (5) has at least one radially circumferential groove (15) in which at least one damping element (14) is located.

3. Transmission according to claim 1, wherein the plurality of strain sensors (9) are distributed radially around the attachment flange (6) in the region of the housing (1), opposite the centering flange (5).

4. Transmission according to claim 1, wherein the attachment flange (6) is spaced apart coaxially from an outer casing (20) of the housing (1) by a radial indent (18).

5. Transmission according to claim 4, wherein the attachment flange (6) is provided with the radially circumferential constriction (19) proximate to the indent (18) and at least one strain sensor (9) is accommodated in the constriction (19).

6. Transmission according to claim 4, wherein a damping element (14) is inserted into the radial indent (18) and comprises an elastically deformable rubber element.

7. Transmission according to claim 6, wherein the damping element (14) comprises an O ring (17).

8. Transmission according to claim 7, wherein a plurality of circumferential grooves (16), which are spaced apart from one another and parallel to each other, are provided on the centering flange (5) and each is provided with a damping element (14).

9. Transmission according to claim 6, wherein the damping element (14) projects outward beyond an outer casing of the centering flange (5).

10. Transmission according to claim 1, wherein at least one strain sensor (9) comprises a strain gauge connected to an evaluation unit (10) and an electronic display system (11).

11. Transmission according to claim 10, wherein radial forces are determined with the at least one strain sensor (9) and when a predefined limiting value is exceeded, a signal is generated and displayed in the electronic display system (11).

12. Transmission according to claim 11, wherein the signals which are generated by the at least one strain sensor (9) are recorded over time, stored in the evaluation unit (10) and, saved in the electronic display system (11).

13. Transmission according to claim 12, wherein the at least one electronic display system (11) is assigned to a base flange (2) of the housing (1).

14. Transmission according to claim 11, wherein transmission-specific data including force, temperature, transit time, and number of revolutions is displayed by the display unit (12).

15. Transmission comprising a driveshaft (3), an output shaft (4) and a housing (1) including a centering flange (5) and an attachment flange (6), the housing (1) is provided with a plurality of strain sensors (9), wherein the housing (1) is provided with a radially circumferential constriction (19) near to the attachment flange (6) and a plurality of the strain sensors (9) are arranged in the circumferential constriction (19) and are attached to the housing in the circumferential constriction (19) for measuring forces and torques acting on the transmission housing (1).

16. Transmission according to claim 15, wherein the attachment flange (6) is spaced apart coaxially from an outer casing (20) of the housing (1) by a radial indent (18).

17. Transmission according to claim 16, wherein the attachment flange (6) is provided with the radially circumferential constriction (19) proximate to the indent (18) and at least one strain sensor (9) is accommodated in the constriction (19).

18. Transmission according to claim 16, wherein a damping element (14) is inserted into the radial indent (18) and comprises an elastically deformable rubber element.

19. Transmission according to claim 18, wherein the damping element (14) comprises an O ring (17).

20. Transmission according to claim 15, wherein at least one strain sensor (9) comprises a strain gauge connected to an evaluation unit (10) and an electronic display system (11).

21. Transmission according to claim 20, wherein radial forces are determined with the strain sensors (9) and when a predefined limiting value is exceeded, a signal is generated and displayed in an electronic display system (11).

22. Transmission according to claim 21, wherein the signals which are generated by the at least one strain sensor (9) are recorded over time, stored in an evaluation unit (10) and, saved in the electronic display system (11).

23. Transmission according to claim 22, wherein the at least one electronic display system (11) is assigned to a base flange (2) of the housing (1).

* * * * *